United States Patent [19]
Cartier

[11] Patent Number: 4,767,177
[45] Date of Patent: Aug. 30, 1988

[54] METHOD FOR SECURING AN ELEMENT IN A BODY, PARTICULARLY AN OPTICAL FIBER

[75] Inventor: Jacques Cartier, Fontenay-Sous-Bois, France

[73] Assignee: Societe Anonyme Dite: Radiall Industrie, Rosny-Sous-Bois, France

[21] Appl. No.: 595,443

[22] Filed: Mar. 30, 1984

[30] Foreign Application Priority Data

Apr. 1, 1983 [FR] France .................... 83 05422

[51] Int. Cl.⁴ .................................. G02B 6/36
[52] U.S. Cl. .................................. 350/96.20
[58] Field of Search .......... 350/96.20, 96.22, 96.21; 29/522 R

[56] References Cited

U.S. PATENT DOCUMENTS

| | | | |
|---|---|---|---|
| 4,181,402 | 1/1980 | Borsuk et al. | 350/96.21 |
| 4,261,721 | 4/1981 | Lewis | 350/96.22 X |
| 4,261,774 | 4/1981 | Lewis et al. | 350/96.22 X |
| 4,378,145 | 3/1983 | Stancati et al. | 350/96.21 |
| 4,389,091 | 6/1983 | Lidholt et al. | 350/96.21 X |
| 4,411,491 | 10/1983 | Larkin et al. | 350/96.20 X |
| 4,422,717 | 12/1983 | Schmidt | 350/96.21 |
| 4,461,539 | 7/1984 | Bailey et al. | 350/96.20 X |
| 4,475,790 | 10/1984 | Little | 350/96.22 X |
| 4,519,672 | 5/1985 | Rogstadius | 350/96.20 |

FOREIGN PATENT DOCUMENTS

| | | | |
|---|---|---|---|
| 0063085 | 9/1982 | European Pat. Off. | 350/96.21 |
| 3109996 | 9/1982 | Fed. Rep. of Germany | 350/96.20 |
| 0049039 | 4/1977 | Japan | 350/96.20 |
| 0034845 | 3/1979 | Japan | 350/96.22 |
| 0141144 | 11/1979 | Japan | 350/96.21 |
| 0155318 | 12/1980 | Japan | 350/96.20 |
| 0057016 | 5/1981 | Japan | 350/96.20 |
| 0123508 | 9/1981 | Japan | 350/96.20 |
| 0130709 | 10/1981 | Japan | 350/96.20 |

*Primary Examiner*—William L. Sikes
*Assistant Examiner*—Akm E. Ullah
*Attorney, Agent, or Firm*—Arnold, White & Durkee

[57] ABSTRACT

A method of mechanically locking an interior element in an outer body with deformable material. The deformable material is permanently deformed against the interior element through circumferentially spaced radial holes in the outer body. This forms a core of deformed material between the inner element and outer body, with some deformable material in each opening. The radial position of the inner element can then be adjusted without shifting the inner element axially, using punch or press elements which are inserted in selected radial openings to further deform the material and thus adjust the inner element radially. The method is particularly useful for centering an optical fiber fixed within an inner element, by so adjusting the radial position of the inner element in an outer ferrule body.

17 Claims, 3 Drawing Sheets

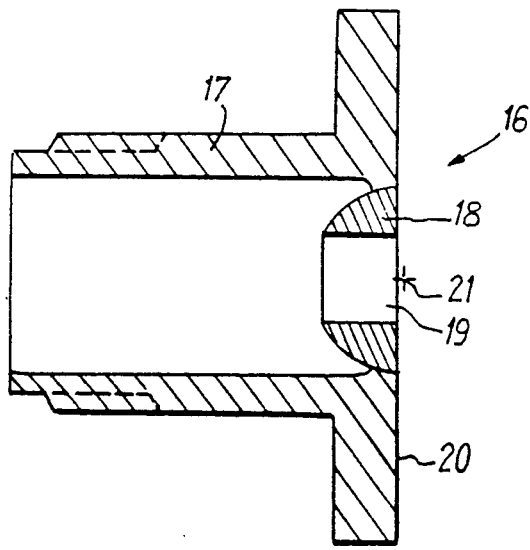
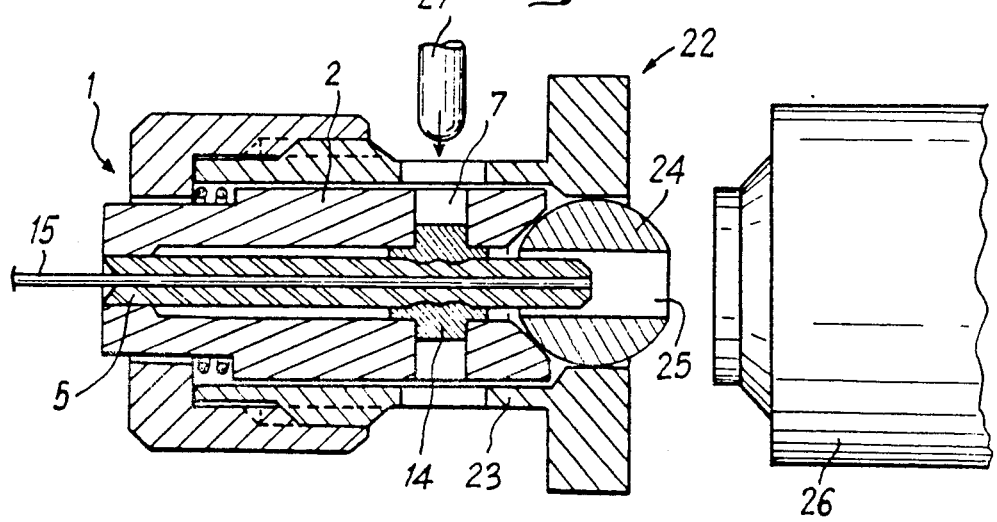

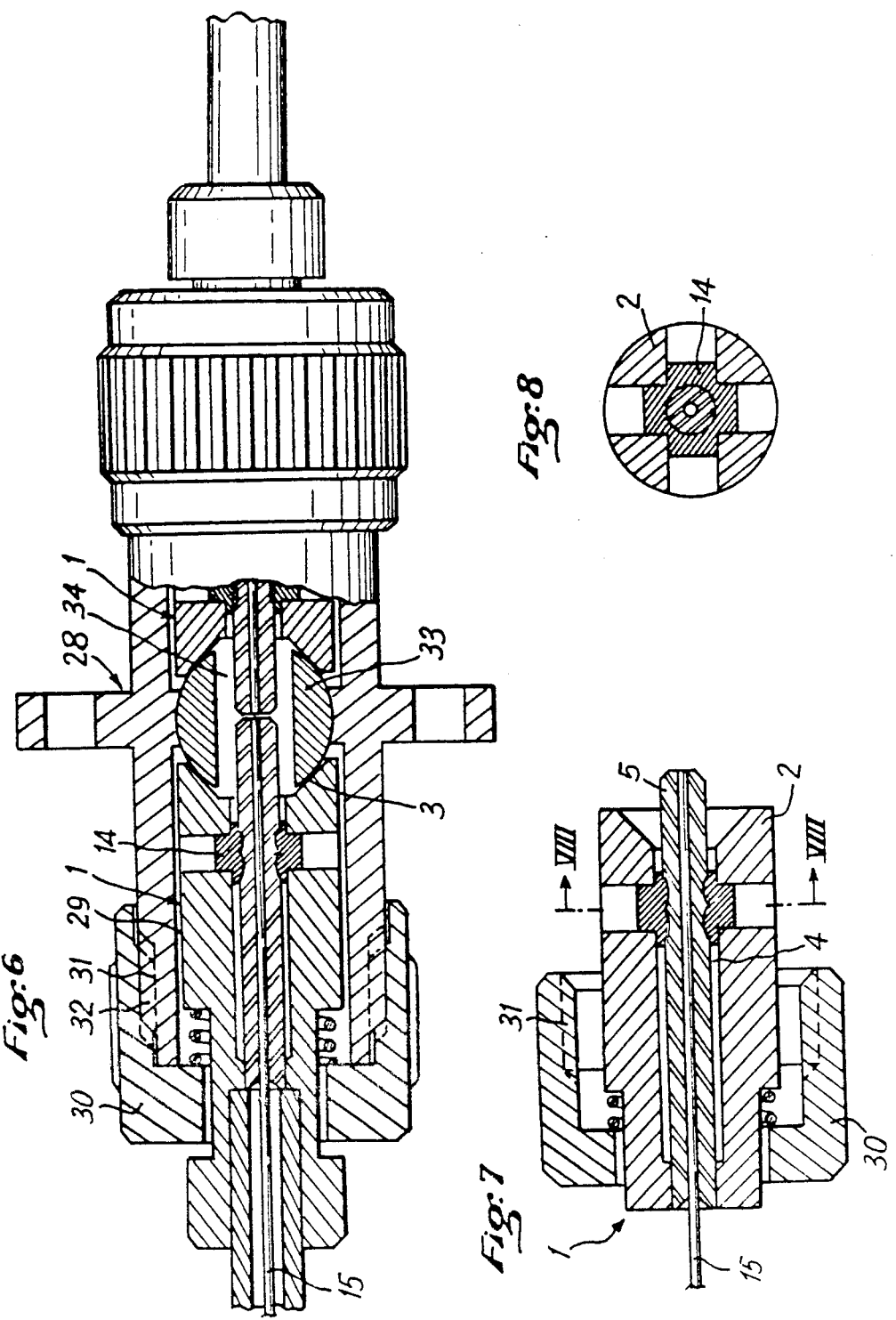

METHOD FOR SECURING AN ELEMENT IN A BODY, PARTICULARLY AN OPTICAL FIBER

The present invention relates to a process for mechanically locking an interior, preferably cylindrical element, in an exterior, preferably tubular body, using locking elements introduced in radial holes of the exterior body and which press against the interior element.

By way of a non-limiting specific embodiment, the process according to the present invention can be used to immobilize an optical fiber in a connector ferrule, the interior element then preferably being a cylindrical tubular element, preferably metallic, particularly of steel, inside which the optical fiber is immobilized by cementing, the exterior body then being the ferrule body.

BACKGROUND OF THE INVENTION

Applicant has already described in its French patent application No. 82 08464 and in U.S. application Ser. No. 366,707 the disclosures of which are incorporated herein by reference, a connector using such mechanical locking for immobilizing an optical fiber in a centered position in a connector ferrule.

The connector described in the prior application, and for which the process according to the present invention can also be used, is of the type having two male ferrules mounted at the ends of the fibers to be connected, and a female reconstitution or aligning connector having a longitudinal bore to support and align the two ferrules face to face.

The female connector comprises, at its axial center within the longitudinal bore, an abutment body for the male ferrules, specifically, a sphere, having a through axial opening and a contact shoulder facing each of the male ferrules. Each male ferrule has an axially extending tubular projection extending into the opening of the abutment body and a conduit or passage into which the optical fiber can be introduced with play, and immobilized so that its end coincides with the end of the projection. Spaced from the end of the projection is an annular groove whose wall defines a contact support engaging the support shoulder of the abutment body of the female connector. These contact supports are axially pressed against the shoulders of the abutment body and cooperate with each other so that, during any relative movement of the shoulders and contact surfaces, the end of a fiber at the end of the male ferrule is maintained at a constant predetermined distance from the center of the abutment body.

In the above mentioned French patent application No. 82 08464, and U.S. application, each of the male ferrules comprises a ferrule body with an annular recess at its end and an interior tubular element, preferably metallic, particularly of steel, placed in a corresponding axial opening of the ferrule body and the end of which constitutes the projection. The mechanical locking means to immobilize the interior tubular element in the ferrule body, take the form of a plurality of small ball bearings forced into the corresponding radial holes of the ferrule body, and press against the interior tubular element.

As described in the prior patent application, the inner element is displaced radially in the ferrule body by micro-displacements of the force fit ball bearings in the radial holes of the ferrule body to bring the center of the optical fiber into coincidence with the axis of the abutment, while the annular groove of the ferrule body, which can be conical, engages the spherical body to center the ferrule.

The forces required to displace the ball bearings are highly dependent on the force fit between each ball bearing and the radial hole in which it is engaged, which leads to very close tolerances in manufacture as well as requiring very good surfaces on both the ball bearings and the radial holes. In addition, it is not always certain that the ball bearings forced into the radial holes, completely immobilize the inner tubular element with respect to the ferrule body.

The radial position of the fiber must in practice be precise within two micrometers, so that the displacement of the ball bearings must be done with at least the same precision.

SUMMARY OF THE INVENTION

The present invention provides a process of mechanically locking an interior element, particularly one which is cylindrical or tubular, in an exterior body, which can also be tubular, in a simple and rapid manner and which specifically avoids precise machining, complex parts, and precise radial displacements.

The method of the invention is characterized essentially by the fact that after the interior element has been placed in the exterior body, deformable elements are positioned in radial openings of the exterior body. These deformable elements are preferably of a relatively soft malleable metal and are compressed and deformed simultaneously with punches in the radial openings to fill the free space between the periphery of the interior element and the surrounding wall of the outer body, with the so deformed material. In essence, the material is permanently deformed around the interior element, in the region of the radial openings.

Preferably, there are four equiangularly spaced radial holes provided in the form of a cross.

In one preferred embodiment, a pre-centering element is used, which includes a ring introduced through an end of the outer body. This centering element engages around the interior element, and the ring is maintained in position during the steps of positioning and compressing the pieces of deformable material, the annular front face of the ring providing a support or stop for the material deformed around the interior element.

The pieces of deformable material are advantageously in the form of balls or cylinders, and are advantageously of a soft metal such as lead, tin, or a tin-lead alloy, it being understood that one can use any malleable material and particularly those malleable alloys or materials which permanently deform under low force or stress.

Preferably, according to the invention, there is formed on the periphery of the interior element, in the region of the radial holes, at least one groove, and preferably two adjacent grooves of concave profile.

The method can advantageously be used for positioning an optical fiber in a connector ferrule comprised of a hollow cylindrical element, which constitutes the interior element described above, in a tubular ferrule body which constitutes the exterior body described above. One then proceeds according to the invention, to form between the interior element and the body of the ferrule, by deformation of the pieces of deformable material, a hub or core of deformed material assuring the retention of the interior element. The extremity of an optical fiber is then immobilized in the interior element by cementing, and by the action of the presses or punches engaging successively in the radial holes of the bushing body, micro-displacements of the interior element are performed to precisely center the fiber in the ferrule body to form the connector.

In the description which follows, it is to be understood that the invention as described constitutes a wholly non-limiting example of a method of using the technique of the invention to form a fiber optic connector.

BRIEF DESCRIPTION OF THE DRAWINGS

FIG. 4 is an axial section showing a jig or fixture which can be used in the step of preparing the ferrule;

FIG. 5 is an axial section showing the step of centering a fiber in a male ferrule, with another fixture, using an optical autocollimator;

FIG. 6 is a view in partial section of a connector assembly for fiber optics, formed in accordance with the method of the invention;

FIG. 7 is a view in section of the male ferrule of the connector of FIG. 6; and

FIG. 8 is a view in section taken along line VII—VII of FIG. 7.

DETAILED DESCRIPTION

Figure 1:
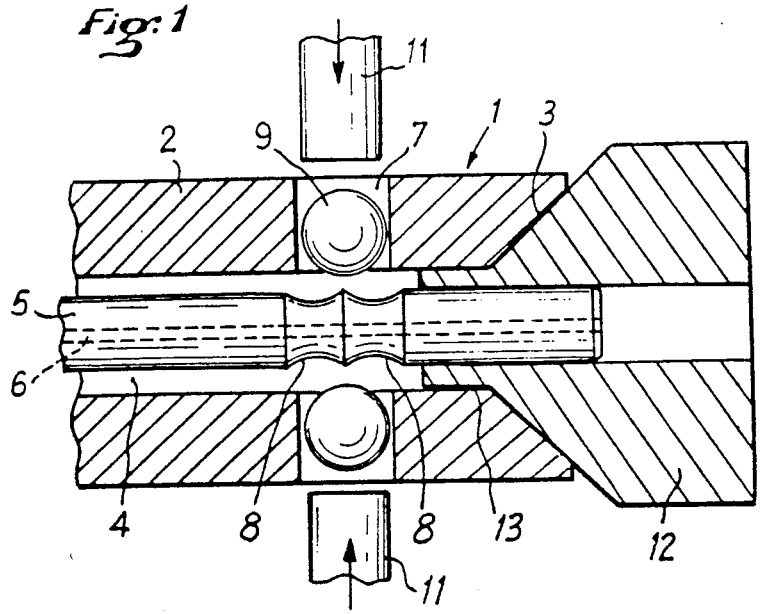
FIG. 1 is a partial view in axial section showing the procedure according to the invention for positioning an interior tubular element in an outer connector ferrule body.
Figure 2:
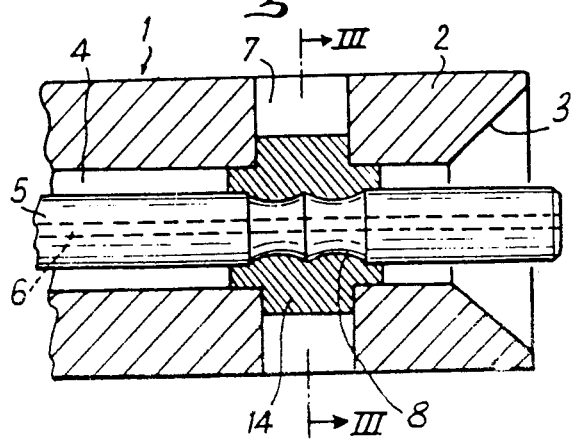
FIG. 2 is a view corresponding to FIG. 1 after deforming the deformable elements around the interior tubular element.
Figure 3:
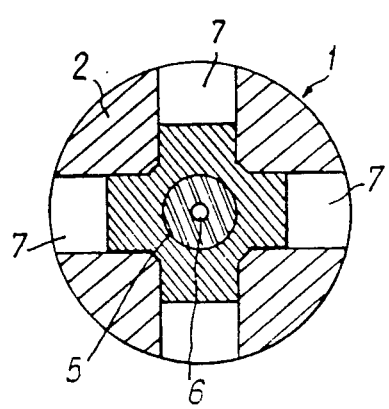
FIG. 3 is a view in section taken along line III—III of FIG. 2.

FIGS. 1–3 show the method according to the invention used to make a male connector ferrule.

The ferrule 1 has an outer body 2 with a countersunk or hollow conical end 3.

The body 2 has an axial bore 4, in the interior of which is positioned an inner tubular metallic element 5 having an axial conduit or opening 6 into which an optical fiber will be inserted. Inner element 5 has a diameter less than the diameter of axial bore 4. The body 2 also has a plurality of radial openings or bores 7 (preferably four, as shown at FIG. 3). In the embodiment shown, pairs of these openings 7 are aligned radially, and the axes of the pairs are perpendicular to each other in the form of a cross as shown at FIG. 3. The axes of these openings lie in a common radial plane of ferrule 2.

The interior tubular element has two adjacent concave grooves 8 in its outer periphery. The combined length of these grooves is slightly greater than the diameter of an opening 7.

Figure 1A:
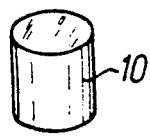
FIG. 1a shows a variation in form of a deformable element usable with the procedure shown at FIG. 1.

In the method according to the invention, a deformable element such as a ball 9 is placed in each of the radial openings 7, as shown at FIG. 1, these deformable elements being of a soft metal which can be tin. The deformable elements can also take the form of short cylinders or slugs 10, as shown at FIG. 1a.

The deformable pieces 9 are compressed and deformed into the region of the grooves 8 of the tubular element 5 by simultaneous engagement of press or punch members 11 in the radial openings 7, and advance of the members 11 in the direction shown by the arrows, at FIG. 1. The flow of the material of the deformable pieces 9 (or 10) is limited by the end face of a ring or bushing 12 having a tubular extremity 13 to assure precentering of the tubular element 5 in the ferrule body 2.

FIG. 2 shows the ferrule after the inner tubular element 5 has been mechanically fixed in the ferrule. It is to be appreciated that the end face of the tubular end 13 of ring 12 provides a stop to limit the extent of flow of the deformable material toward the end 2 of ferrule 1.

It can thus be seen that by deforming the deformable pieces 9 or 10, under the action of the punch or press elements 11, there is formed a hub or core 14 of material which substantially fills the annular space between the inner tubular element 5 and the outer body 2 in the region of the grooves 8, a portion of the core 14 projecting into the radial openings 7. It is thus assured that there is a very good mechanical retention of the inner element 5 in the outer body 2. It is to be understood that the radial holes 7 can be made with relatively coarse manufacturing tolerances, for example, on the order of 0.1 mm, and the same is true for the deformable pieces 9 or 10 which are to be introduced in these radial openings or bores.

It is believed equally clear that the grooves 8 provided in the peripheral wall of the tubular inner element 5 are of a size and profile to favor the displacement of the material of the pieces 9 or 10 during their deformation by punch or press element 11. However, an inner element with a rough outer surface or grooves of other shaped can be used with good results.

To make a connector, after mechanically fixing inner elements 5 in outer bodies 2 to form ferrules 1, a fiber optic element 15 is inserted into the axial opening of each tubular element 5 and is immobilized by cementing to the end of the axial conduit. Then, the ferrule is further processed to precisely locate the end face of the optical fiber. For this purpose, there is used, as explained in the earlier application, a gauge or fixture such as that shown at FIG. 4.

The gauge 16 comprises a body 17 virtually identical to a female connector half, and an abutment body comprising a spherical segment 18 provided with a longitudinal opening 19. This segment 18 has a rear face in a plane 20, spaced several micrometers, for example, on the order of of 3 or 4 micrometers, relative to the geometric center 21 of its spherical surface.

After locating the ferrule 1 in the gauge 16, with its conical end face 3 against surface 18, the end face of the fiber is precisely positioned axially by cutting off and polishing the end face of the tubular inner element and fiber, along a plane parallel to the plane 20, and close to the geometric center 21.

To then radially center the fiber in the male ferrule, the jig or fixture 22 shown at FIG. 5 is used. Fixture 22 comprises a body 23 with characteristics identical to a female connector half, and a sphere 24 having a longitudinal bore 25. The ferrule is mounted in the fixture as shown at FIG. 5 and is positioned in front of the objective of an optical autocollimator or autocollimating telescope 26.

The general principle of this step of centering has been described in the earlier application No. 82 08464 and therefore will not be again described in great detail here.

It is sufficient to simply indicate that for correcting the radial position of the fiber 15 fixed in the inner tubular element 5, relative to the center of sphere 24, a press element 27 is introduced into one of the radial openings and is forced against the core of material 14 which retains inner element 5 in the ferrule body 2. Because of the malleable material of the core 14, a compressing force by press element 11 causes displacement of the material 14, which flows in the direction of the force to radially displace the inner element 5 relative to ferrule body 2, thereby also displacing the optical fiber fixed in the inner element 5.

This forcing operation by the press element is repeated in one or more other radial openings until the inner element and thus the fiber is moved to a position perfectly centered relative to sphere 24.

It will correspondingly be understood that in accordance with the method of the invention, good retention of the tubular element within the core body is obtained, and because of the nature of the deformable material used to obtain this retention, accurate center positioning within several micrometers can be obtained.

The force necessary to cause the adjusting or positioning is independent of the geometric and manufacturing tolerances of the components, and depends primarily on the hardness of the material of the deformable pieces 9 or 10, and the form of the press element 27, whose end can be rounded as shown at FIG. 5.

This rounded end provides demultiplication or division of the displacement between tubular element 5 and ferrule 2, relative to the displacement of the press element 27. Thus, a positioning precision of the fiber, of for example, two micrometers, can be obtained by a displacement precision of the rounded end press element 27, of 2 to 5, or 4 to 6 micrometers.

During each precise centering of the optical fiber, by shifting the inner element radially, the autocollimating telescope is used. If the fiber is found to be, for example, two microns off-center, toward a particular hole 7, the press element 27 (with the rounded end) is inserted in that hole, and is moved inwardly about 4 microns to attain precise centering. Trial and error centering is thereby largely eliminated.

FIG. 6 shows an assembled connector with two male ferrules of the type shown at FIGS. 7 and 8, and formed in the manner previously described. The characteristics of the connector are, for assembly, similar to those of the connector described in the French application No. 82 08464 and U.S. application Ser. No. 366,707.

The connector 28 shown at FIG. 6 takes the form of a female alignment connector into the opposite end of which male ferrules 1 are inserted so that the ends of the optical fibers of the respective ferrules 1 face each other.

The male ferrules are disposed in a longitudinal opening 29 of the female connector and are retained by the nuts 30 whose threads 31 cooperate with corresponding threads 32 at the ends of the female connector.

The longitudinal opening 29 of the female connector, in its central region, is provided with a sphere 33 having an axially traversing opening 34.

The ferrules 1 are pressed toward the sphere 33 by compression springs between nuts 30 and the ferrules so that the conical recesses 3 engage opposite sides of the sphere 33. Since the optical fiber of each ferrule 1 is precisely centered relative to conical recess 3, as was explained with reference to FIG. 5, and since the sphere 33 is identical to the sphere 24 used during such precise centering, the ends of the optical fibers become precisely axially aligned with each other in the opening 34 of the sphere 33, simply by inserting the ferrules and tightening the nuts 30.

In this assembly, the end faces of the fibers are also a predetermined desired distance apart by virtue of the end facing and polishing performed using the jig of FIG. 4, whose part sphere 18 has the same radius of curvature as the sphere 33 of the connector 28.

Correspondingly, precise axial positioning of the ends of the fibers as well as precise axial alignment is assured by assembling the connector.

While the invention has been described in connection with a particular embodiment, it is well evident that it is not thereby limited, and that numerous changes and modifications can be made without departing from the scope or spirit of the invention.

I claim:

1. A method of mechanically locking an interior element in an opening of an outer body comprising, providing a hollow outer body having, in a transverse region thereof, a plurality of generally radial circumferentially spaced apart openings, positioning the interior element within the body in the region of the radial openings, placing at least one piece of malleable metal in each of said radial openings, and tools into said radial openings to mechanically deform the malleable metal through said openings and against the interior element into a space between the outer periphery of the interior element and the facing inner surface of the exterior body.

2. A method according to claim 1 wherein the step of mechanically deforming comprises, mechanically deforming the malleable metal around the interior element to substantially fill the space between the interior element and the outer body.

3. A method according to claim 1 wherein the outer body is tubular, the interior element is cylindrical, and the interior element is introduced axially into the opening of the outer body.

4. A method according to claim 3 wherein the interior element is tubular and has a central axially extending opening.

5. A method according to claim 2 further comprising, first centering the interior element within the exterior body by using a centering ring extending into one end of the body and engaging around the interior element, and then mechanically deforming the malleable metal around the interior element and against a front face of the centering ring.

6. A method according to claim 1 wherein the pieces of malleable metal comprise pieces of malleable metal in the form of balls.

7. A method according to claim 1 wherein the pieces of malleable metal comprise pieces of malleable metal in the form of cylinders.

8. A method according to claim 1 wherein the malleable metal comprises lead.

9. A method according to claim 1 wherein the malleable metal comprises tin.

10. A method according to claim 1 wherein the malleable metal comprises an alloy of tin and lead.

11. A method according to claim 1 wherein the inner element has at least one groove, the inner element is positioned with the groove in the region of the radial openings prior to deforming the malleable metal, and the malleable metal is deformed into the groove.

12. A method according to claim 11 wherein the groove comprises an annular groove with a concave profile.

13. A method according to claim 12 wherein the interior element has two adjacent annular grooves, each of concave profile.

14. A method according to claim 1, further comprising, further deforming said malleable metal through the radial openings to adjust the radial position of the interior element relative to the axis of the outer body.

15. A method of making an optical fiber connector ferrule comprising, providing a hollow outer ferrule body having a side wall with generally radial, circumferentially spaced apart openings in a transverse region thereof, positioning an interior element having an optical fiber secured therein within the ferrule body so that the interior element extends through the region of the radial openings, holding the inner element in an axially centered position within the outer body, placing a solid piece of malleable metal in each of said plurality of radial openings, mechanically deforming the malleable metal through said openings to cause the malleable metal to deform against the interior element in a space between the interior element and the outer body, to form a core of material in the space to fix the inner element in the centered position within the outer body.

16. A method according to claim 15, further comprising, further mechanically deforming the malleable metal through the radial openings to adjust the position of the axis of the interior element radially of the outer body of the ferrule.

17. A method according to claim 16 wherein said step of further mechanically deforming comprises, deforming the malleable metal with a press element extending into one of the radial openings of the outer body.

* * * * *

UNITED STATES PATENT AND TRADEMARK OFFICE
CERTIFICATE OF CORRECTION

PATENT NO. : 4,767,177
DATED : August 30, 1988
INVENTOR(S) : Jacques Cartier

It is certified that error appears in the above-identified patent and that said Letters Patent is hereby corrected as shown below:

In Column 6, line 22, between "and" and "tools" insert --inserting--.

Signed and Sealed this

Ninth Day of May, 1989

Attest:

DONALD J. QUIGG

Attesting Officer

Commissioner of Patents and Trademarks